United States Patent
Rivera et al.

(10) Patent No.: US 8,918,098 B2
(45) Date of Patent: Dec. 23, 2014

(54) DEVICE FOR INTERCEPTING AND ANALYZING TRAFFIC FOR A TERMINAL

(75) Inventors: Thomas Rivera, Paris (FR); Dean Mathoorasing, Issy les Moulineaux (FR)

(73) Assignee: Orange, Paris (FR)

( * ) Notice: Subject to any disclaimer, the term of this patent is extended or adjusted under 35 U.S.C. 154(b) by 1458 days.

(21) Appl. No.: 11/989,446

(22) PCT Filed: Jul. 24, 2006

(86) PCT No.: PCT/FR2006/001804
§ 371 (c)(1), (2), (4) Date: May 2, 2008

(87) PCT Pub. No.: WO2007/012745
PCT Pub. Date: Feb. 1, 2007

(65) Prior Publication Data
US 2008/0280603 A1 Nov. 13, 2008

(30) Foreign Application Priority Data
Jul. 26, 2005 (FR) ....................................... 05 07976

(51) Int. Cl.
| | |
|---|---|
| H04W 24/00 | (2009.01) |
| H04M 3/22 | (2006.01) |
| H04L 29/06 | (2006.01) |
| H04W 12/02 | (2009.01) |
| H04M 3/36 | (2006.01) |
| H04L 12/66 | (2006.01) |
| H04L 1/00 | (2006.01) |
| G06F 15/173 | (2006.01) |

(52) U.S. Cl.
CPC ............. *H04L 63/00* (2013.01); *H04M 3/2281* (2013.01); *H04M 3/2218* (2013.01); *H04L 63/30* (2013.01); *H04W 12/02* (2013.01); *H04M 3/36* (2013.01)
USPC ............ 455/423; 370/352; 370/252; 709/224

(58) Field of Classification Search
USPC ......................................................... 455/423
See application file for complete search history.

(56) References Cited

U.S. PATENT DOCUMENTS

2002/0118671 A1* 8/2002 Staples et al. ................. 370/352
2003/0157895 A1* 8/2003 Agrawal et al. .............. 455/67.1
(Continued)

FOREIGN PATENT DOCUMENTS

GB EP 0986229 A2 * 8/1999

OTHER PUBLICATIONS

Fluke Networks: Etherscope Network Assistant, Internet Publication, Nov. 22, 2004, pp. 1-3, XP002378731 <http://web.archive.org/web/20041122034859/http://www.flukenetworks.com/us/LAN/Handheld+Testers/EtherScope/Features/Analyze+Traffic.htm>.

(Continued)

*Primary Examiner* — Timothy Pham
(74) *Attorney, Agent, or Firm* — Knobbe Martens Olson & Bear LLP

(57) ABSTRACT

A device and method for intercepting and analyzing traffic for terminals connected to a telecommunications network, according to wireless technology, using telecommunications standards. A terminal is connected to a telecommunication network such that the terminal can transmit and receive with the network. The terminal executes at least one service on the network in accordance with at least one communication protocol and a graphic user interface. The device also intercepts and stores data frames exchanged over the network by said terminal in the context of services being executed, and analyzes the stored frames to deduce parameters characterizing the connection of the terminal to the network. The device also identifies the various executed services and their associated instantaneous rate, and while allowing real time viewing of the parameters characterizing the connection via the graphic user interface.

11 Claims, 3 Drawing Sheets

(56) References Cited

U.S. PATENT DOCUMENTS

| | | | |
|---|---|---|---|
| 2005/0090940 A1* | 4/2005 | Pajakowski et al. | 701/1 |
| 2005/0108573 A1* | 5/2005 | Bennett et al. | 713/201 |
| 2005/0177515 A1* | 8/2005 | Kalavade et al. | 705/52 |
| 2005/0182738 A1* | 8/2005 | Prouvost et al. | 706/46 |
| 2005/0249125 A1* | 11/2005 | Yoon et al. | 370/252 |
| 2005/0259591 A1* | 11/2005 | Moore et al. | 370/252 |
| 2006/0183471 A1* | 8/2006 | Samuel et al. | 455/423 |
| 2006/0224724 A1* | 10/2006 | Marinescu et al. | 709/224 |
| 2007/0086402 A1* | 4/2007 | Rueckriem | 370/338 |

OTHER PUBLICATIONS

Pocket Warrior Wi-Fi Surveying Tool for the Pocket PC, web printout, as available at http://pocketwarrior.sourceforge.net/index.html on Jul. 13, 2012, 8 pages.

Ethereal The world's most popular network protocol analyzer, web printout, as available at http://www.ethereal.com/ on Jul. 13, 2012, 1 page.

\* cited by examiner

DEVICE FOR INTERCEPTING AND ANALYZING TRAFFIC FOR A TERMINAL

RELATED APPLICATIONS

This application claims priority to PCT Application No. PCT/FR2006/001804 filed Jul. 24, 2006, and French Application No. 0507976 filed Jul. 26, 2005, the disclosures of which are hereby incorporated by reference in their entireties.

FIELD OF THE INVENTION

This invention relates to the field of telecommunications. The invention relates more specifically to a device for intercepting and analyzing traffic for terminals connected to a telecommunications network, according to wireless technology, using, for example, the telecommunications standard IEEE 802.11 and its follow-ups, more commonly called Wifi (for "Wireless Fidelity"), or the standard based on the radio transmission standard IEEE 802.16, known as Wimax.

The invention, in reference to FIG. 1, is situated in the context of the coming deployment of new mobile wireless networks, in particular Wifi, based on shared access to an IP network 10 among a plurality of users through an xDSL modem 20 of a subscriber, typically an ADSL (for "Asymmetric Digital Subscriber Line") modem, integrating a Wifi terminal 30 including a Wifi router coupled to an antenna. Indeed, when enough subscribers are equipped with such modems integrating the Wifi terminal and the ADSL modem, it will be possible to envisage deploying mobile Wifi networks by allocating a portion of the bandwidth associated with each modem to the host of the modem and another portion to the various potential users. Each user, connected by a Wifi connection 40 to the terminal by means of a PDA-type ("Personal Digital Assistant") mobile terminal 50 or a smart mobile telephone equipped with a Wifi connection module, will then have access to the IP network to which said radio terminal is connected and can implement various services on the network such as Internet navigation, voice over IP, real-time streaming, and other services according to other communication protocols of the same type.

In such a context, the user, before calling upon a service on the network, will then need to know whether he/she has enough bandwidth allocated in order to be capable of initiating the desired service. He/she should therefore ideally be capable of obtaining information making it possible to dynamically characterize his/her connection to the network, in particular in order to be capable of identifying, at any time, the various services in progress, their associated speed on the radio connection, as well as the maximum speed allocated to him/her.

User access to such information associated with the characteristics of the network connection that the user has established is therefore essential in these Wifi networks, in order to enable the client to better manage his/her radio connection and the various services that he/she wants to implement according to the bandwidth that has been allocated to him/her.

BACKGROUND OF THE INVENTION

The prior art includes software modules for PDA-type mobile terminals, making it possible to carry out the detection of Wifi terminals. Such a device is described on the Web at the address http://pocketwarrior.sourceforge.net. However, there is no device for a PDA capable of precisely characterizing the client's connection and that is capable, for example, of dynamically intercepting and analyzing radio traffic in order to identify the various protocols implemented.

Such devices for intercepting and analyzing traffic associated with an interface making it possible to characterize network connections are however known in the field of the PC. Such software modules exist in practically all operating systems for PC. For example, the information delivered by the Windows XP operating system for an established client/server connection is as follows: the duration of the connection upon establishment thereof, the maximum possible speed of the connection, the number of data packets received and sent, the IP address, the subnet mask and default gateway, etc.

In general, the information characterizing a network connection, which is made available by the operating systems, essentially concerns the exchanged volumes and the duration of the connection. These utilities are not, however, present on PDA-type mobile terminals, primarily due to the fact that the on-board operating systems are made significantly lighter.

In addition, when one wants to obtain more precise information on the characteristics of the connection, which is capable, for example, of providing an identification of the various protocols implemented, it leads to complex client solutions and consumes significant amounts of computation and memory resources, and is therefore even less suitable in a lighter environment such as that offered by PDA-type mobile terminals or smart telephones. These solutions have in fact been developed for network administrators or engineers wanting to conduct load tests or traffic analysis and cannot be transposed to the on-board world. For example, it is possible to cite a tool such as Ethereal (http://www.ethereal.com), which is a protocol analyzer of the type mentioned above.

SUMMARY OF THE INVENTION

This invention is intended to overcome these disadvantages by proposing a device for characterizing traffic suitable for on-board terminals, making it possible in particular for a client to view, in real time, the state of his/her wireless connection and in particular to identify the various services implemented, with minimal impact on the user's equipment resources.

With this objective in view, the invention relates to a terminal including connection and transmission/reception means with at least one telecommunications network, means for executing at least one service on said network according to at least one communication protocol and a graphic user interface, characterized in that it includes:

means for intercepting and storing data frames exchanged on the network by said terminal in the context of services being executed, means for analyzing said frames stored so as to deduce parameters for characterizing the connection of said terminal to the network, including means for identifying the various services implemented and their associated instantaneous speed, and means for real-time viewing of said parameters for characterizing the connection through said graphic user interface.

A sort is carried out to determine whether the intercepted frames are from a real-time or a non-real-time application. To do this, the means for analyzing stored data frames include means for distributing the frames according to their protocol type, real-time or non-real-time.

The means for analyzing stored data frames also include means for counting the number of frames relating to real-time services and the number of frames relating to non-real-time services. Thus, the characterization parameters relating to the speed associated with each service identified as real-time or non-real-time can easily be determined.

The display means preferably include means for displaying characterization parameters for each service identified. Such a display for each service implemented offers the user a precise characterization of the state of his/her connection at any time.

According to one embodiment, the means for intercepting and analyzing data frames include a protocol-type NDIS software driver intended to cooperate with the connection and transmission/reception means of the terminal with the telecommunications network.

The invention also relates to a method for characterizing the connection of a terminal with a telecommunications network, wherein said terminal includes means for executing at least one service on said network according to at least one communication protocol, which method is characterized in that it includes steps of:

intercepting data frames exchanged on the network by said terminal in the context of services being executed, storing said intercepted frames, analyzing said stored frames so as to deduce parameters characterizing the connection including the identification of various services implemented and their associated instantaneous speed, and displaying, in real-time, said parameters characterizing the connection through a graphic user interface.

The analysis step includes a distribution of intercepted frames stored according to their type of protocol, real-time or non-real-time, and a counting of the number of frames relating to real-time services and the number of frames relating to non-real-time services.

The invention also relates to a computer program including program code instructions for executing the steps of the method according to the invention, intended to be executed by a terminal, when said program is run on the terminal.

According to one embodiment, the computer program according to the invention is implemented in the form of a protocol-type NDIS driver, intended to cooperate with a network card integrated in the terminal.

Finally, the invention relates to a recording medium capable of being read by a terminal on which the program according to the invention is registered.

BRIEF DESCRIPTION OF THE DRAWINGS

Other features and advantages of this invention will become clearer on reading the following description provided for illustrative and non-limiting purposes, in reference to the appended figures, in which.

DETAILED DESCRIPTION OF THE DRAWINGS

Figure 1:
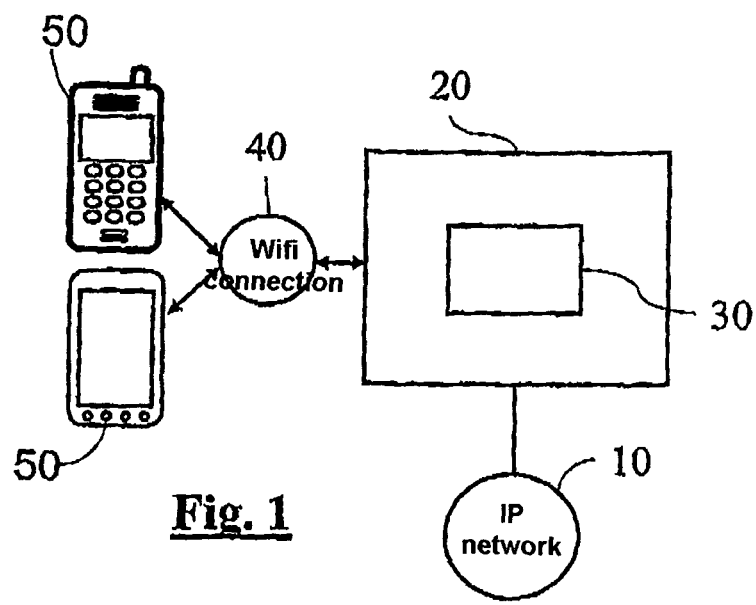
FIG. 1 diagrammatically depicts a context of application according to an embodiment of this invention.
Figure 2:
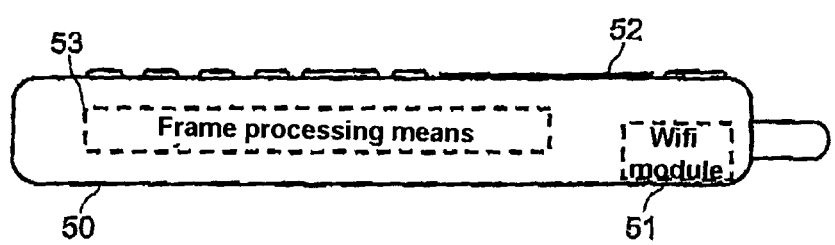
FIG. 2 depicts a mobile terminal equipped with means for implementing an embodiment of the invention.

The invention therefore aims to provide a mobile terminal 50, as shown in FIG. 2, connected to a telecommunications network by means of a wireless connection module 51, a set of information enabling the user to comprehensively characterize the connection established between the terminal 50 and the network and in particular, to characterize the various communication services implemented as well as their associated speed on the radio connection. The wireless connection module 51, making it possible to provide the connection and the transmission/reception of data frames of the mobile terminal 50 with the telecommunications network, is for example constituted by a Wifi-type network card and its associated software driver.

To do this, the mobile terminal 50 includes specific processing means 53, integrating a graphic user interface intended to be displayed on the screen 52 of the mobile terminal 50 and having very specific functionalities, which will be described in greater detail below, advantageously enabling the user to better manage his/her radio connection as well as the bandwidth allocated to him/her.

To do this, the processing means 53 first implement means for intercepting and storing data frames exchanged on the network by the terminal 50 in the context of services that it has requested and that are being executed. The processing means 53 also include means for analyzing frames previously stored, making it possible to deduce parameters characterizing the connection of the terminal 50 to the network, relating primarily to an identification of the various communication protocols implemented and their associated instantaneous speed. Finally, the processing means 53 implement means for displaying these parameters characterizing the connection in real time through the graphic user interface.

The processing means 53 therefore make it possible first to intercept the traffic exchanged uplink and downlink, then to store this data in order to analyzing with a view to deducing the parameters needed by the user: instantaneous speed for each application, overall speed, etc.

The processing means 53 are constituted by a software module that, according to an embodiment, is developed on the basis of the dotNet platform (language developed by the Microsoft company), having the advantage of implementing tools and API ("Application Program Interface) compatible with all types of terminals (PDA, smart telephone, PC). The choice of dotNet therefore involves an implementation in a Windows environment, while the graphic user interface associated with the traffic interception and analysis means can entirely be developed for terminals running under other operating systems.

The approach adopted is to short-circuit the network communication protocol stack, called TCP/IP stack, so as to have direct and total access at the IP packet level. Unfortunately, the lighter Windows CE operating system, intended for on-board terminals such as portable telephones, pocket computers, etc., does not have this possibility. To counter this impossibility, it is therefore necessary to go lower into the OSI layers, using the NDIS standard ("Network Driver Interface Specification").

Indeed, when one application wants to communicate with another application by passing through a network interface, the messages sent by this application must pass through TDI (for "Transport Data Interface") and NDIS interfaces.

The OSI model, which breaks down the various protocols of a 7-layer stack, can be used to describe the series of Internet protocols. In a protocol stack, each layer solves a certain number of problems relating to the transmission of data, and provides well-defined services at the upper layers.

The upper layers are closer to the user and manage more abstract data, using the services of the lower layers that format this data so that it can be transmitted over the physical connection.

The Wifi standard is intended to define the lower layers of the OSI model for a wireless connection, i.e. the physical layer and the data connection layer, which is constituted by two sub-layers: the checking of the logic connection and the control of access to the medium or MAC layer.

The data connection layer in fact defines the interface with the Wifi network card and the sharing of the transmission connection. The network card provides the interface between the physical layer and the network and its function is to prepare, send and check the data on the network.

The device drivers for the sub-layers of the data connection layer therefore move data received in the physical layer by the network card and transmit it to the other layers of the OSI model. A MAC driver or a network card driver is thus a device driver located in the MAC sub-layer, providing low-level access to the network cards. The NDIS interface provides a set of generic functions making it possible to be independent of the type of network card. It is in fact a standard defining an interface for the communication between the MAC layer and the network communication protocols. NDIS therefore defines the software interface used by the network communication protocols in order to communicate with the network card and is located between the NDIS protocol drivers and the network equipment drivers (Ethernet driver, Wifi, etc.). The programming interface thus designed authorizes the use of a single hardware configuration with a plurality of network communication protocols.

To have visibility on the IP packets exchanged by network equipment and thus to perform the function of intercepting data frames exchanged on the network by the terminal in the context of services being executed, it is therefore necessary to have a protocol-type NDIS software driver dedicated to this function and located above network card drivers. The operation principle of the protocol-type NDIS software driver is to be recorded on one or more network cards via a process called "binding", used to establish the initial communication channel between the protocol driver and the network card driver. The protocol-type NDIS software driver is therefore used to re-connect the network card drivers and those of the communication protocols and makes it possible to indicate the type of packets desired.

As regards the processing of information coming from the protocol-type NDIS software driver, one method consists of storing intercepted data frames in order to lose the fewest possible frames, then by distributing the frames according to their protocol type, real-time or non-real-time, their count, their display through the graphic user interface and finally the memory dump.

Figure 3:
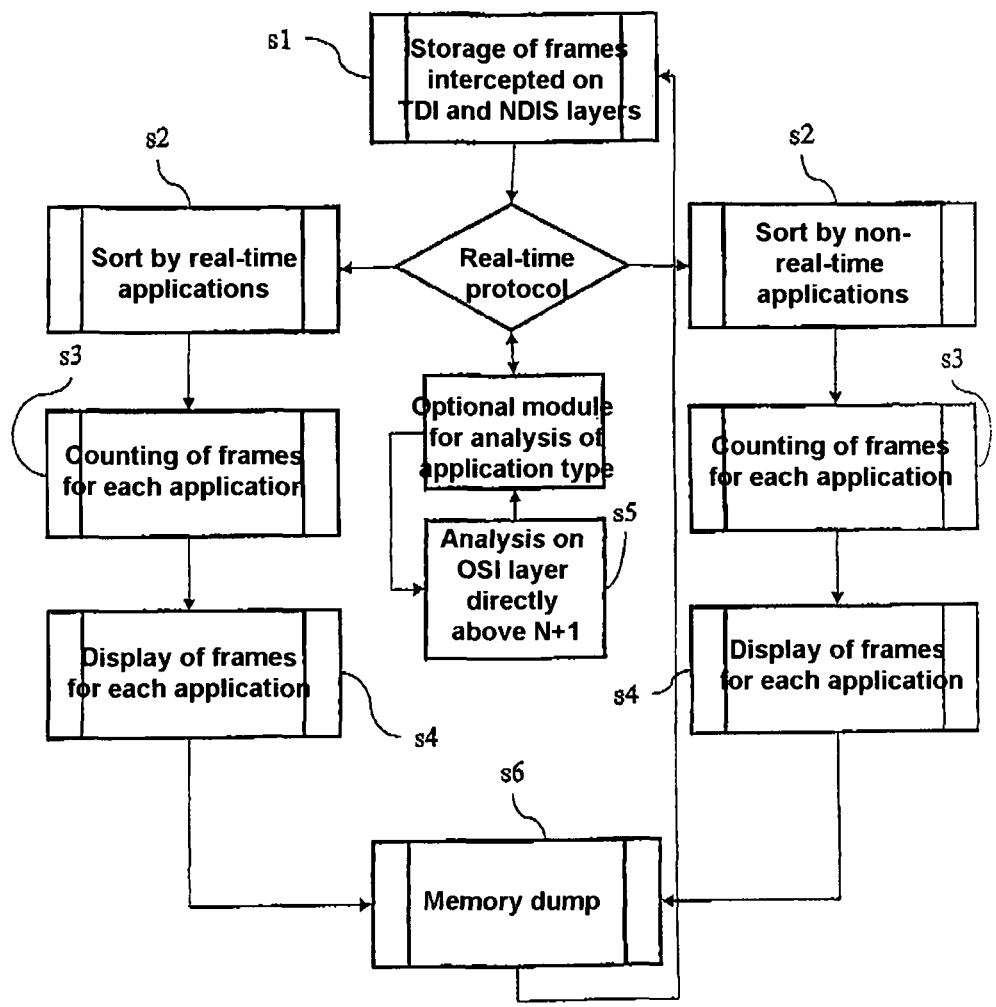
FIG. 3 is an organizational chart showing the main steps of an algorithm implementing an embodiment of the invention.

This method is based on the algorithm of FIG. 3, showing the linkage of sequences described above. First, the frames are therefore intercepted and saved in s1 in a buffer storage of the terminal. A first sort in s2 is then performed in order to determine whether the frame intercepted is from a real-time or a non-real-time application. This sort is more or less difficult to perform according to the application. In addition, an optional module for analyzing the type of application can be provided, which makes it possible to eliminate the uncertainty concerning the real-time or non-real-time character of the application. A recurrent and bottom-up analysis s5 in terms of OSI layers (from the bottom layer toward the application layer) enables the module to identify the real-time or non-real-time character of the frame intercepted but not yet counted. This analysis is itself interrupted when the information has been obtained and the frame is routed toward the corresponding branch of the algorithm. The two branches of the algorithm have the same structure: a sort of the frames intercepted by real-time or non-real-time application, a counting in s3 of the frames for each application enabling the identification of speeds associated with the various applications, and finally a display, through the graphic user interface in s4, of the various parameters obtained for characterizing the network connection concerning the identification of the various services implemented and their associated instantaneous speed. Finally, a buffer storage dump is performed in s6.

Figure 4:
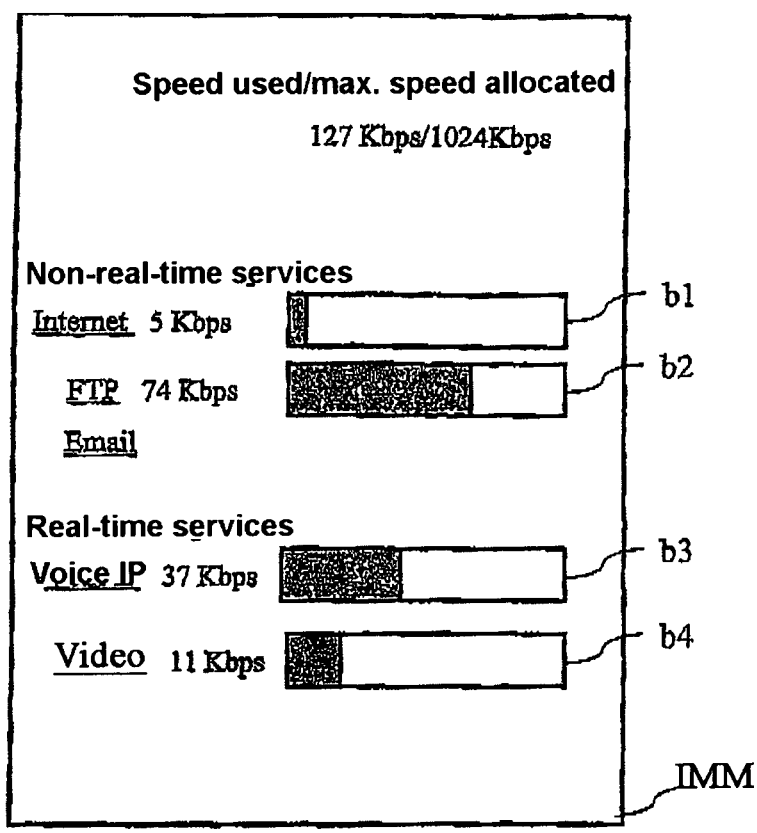
FIG. 4 shows an example of a graphic user interface obtained according to an embodiment of the invention.

The software module according to the invention therefore implements the graphic user interface elements, making it possible for the user to view, in real time, the parameters characterizing the connection of the mobile terminal to the network. An example of such an interface is shown in FIG. 4. According to this example, the parameters characterizing the connection are displayed through the graphic user interface GUI in the form of bar graphs b1 to b4, giving each of the representative values of the speed associated with the various services implemented, namely, according to this example, the current speeds associated with the following respective non-real-time and real-time services: Internet and FTP, voice over HP and video. This information also makes it possible to display the current speed used with respect to the maximum speed allocated. The graphic user interface therefore enables the user to identify the type of service used and to decide whether he/she can activate a new one, according to the remaining bandwidth and the subscription to which he/she has subscribed.

The software module according to the invention enabling the interception of traffic, the analysis and display of traffic in real-time on the terminal through an associated graphic user interface is particularly suitable for compatible Wifi/GPRS or Wifi/UMTS mobile terminals, operating in particular with a lighter operating system of the Symbian, Pocket PC or Palm type, etc.

The invention claimed is:

1. An on-board user terminal or mobile user terminal having connection and transmission/reception means with at least one telecommunications network, means for executing at least one service requested by said on-board user terminal or mobile user terminal on said at least one telecommunications network according to at least one communication protocol and a graphic user interface, wherein the on-board user terminal or mobile user terminal terminal comprises:
    means for intercepting and storing data frames exchanged on the at least one telecommunications network by said on-board user terminal or mobile user terminal in the context of services being executed;
    means for analyzing said data frames stored so as to deduce parameters for characterizing the connection of said on-board user terminal or mobile user terminal to the at least one telecommunications network, including means for identifying the various services implemented and the services' associated instantaneous speed based on a result of the deduced parameters; and
    means for real-time viewing of said parameters for characterizing the connection through said graphic user interface;
    wherein the means for analyzing stored data frames comprises means for distributing the frames according to protocol type of the frames, real-time or non-real-time; and
    wherein the means for analyzing stored data frames comprises means for counting a number of frames relating to real-time services and a number of frames relating to non-real-time services.

2. The on-board user terminal or mobile user terminal according to claim 1, wherein the display means comprises means for displaying characterization parameters for each service identified.

3. The on-board user terminal or mobile user terminal according to claim 1, wherein the means for intercepting and storing data frames comprises a protocol-type Network Driver Interface Specification (NDIS) software driver adapted to cooperate with the connection and transmission/reception means of the on-board user terminal or mobile user terminal with the telecommunications network.

4. A method for characterizing a connection of an on-board user terminal or mobile user terminal with a telecommunications network, wherein said on-board user terminal or mobile user terminal comprises means for executing at least one service requested by said on-board user terminal or mobile user terminal on said network according to at least one communication protocol, wherein the method comprises:
   intercepting data frames exchanged on the network by said on-board user terminal or mobile user terminal in the context of services being executed;
   storing said intercepted frames;
   analyzing said stored frames so as to deduce parameters characterizing the connection including the identification of various services implemented and an associated instantaneous speed of the services based on the deduced parameters, wherein said analysis of the stored frames comprises distributing the frames according to protocol type of the frames, real-time or non-real-time and counting a number of frames relating to real-time services and a number of frames relating to non-real-time services; and
   displaying, in real-time, said parameters characterizing the connection through a graphic user interface.

5. The method according to claim 4, wherein the analysis comprises a distribution of intercepted frames stored according to a type of protocol of the frames, real-time or non-real-time, and a counting of the number of frames relating to real-time services and the number of frames relating to non-real-time services.

6. A non-transitory computer-readable medium comprising a program including program code instructions for executing a method for characterizing a connection of an on-board user terminal or mobile user terminal with a telecommunications network, wherein the program is adapted to be executed by a terminal when said program is run on the terminal and wherein said method comprises:
   intercepting data frames exchanged on the network by said on-board user terminal or mobile user terminal in the context of services being executed;
   storing said intercepted frames;
   analyzing said stored frames so as to deduce parameters characterizing the connection including the identification of various services implemented and an associated instantaneous speed of the services based on the deduced parameters, wherein said analysis of the stored frames comprises distributing the frames according to protocol type of the frames, real-time or non-real-time and counting a number of frames relating to real-time services and a number of frames relating to non-real-time services; and
   displaying, in real-time, said parameters characterizing the connection through a graphic user interface.

7. The non-transitory computer-readable medium according to claim 6, wherein the program is implemented in the form of a protocol-type Network Driver Interface Specification (NDIS) driver, adapted to cooperate with a network card integrated in the terminal.

8. A non-transitory recording medium capable of being read by a terminal on which a program is registered, wherein said program includes code instructions for executing a method for characterizing a connection of an on-board user terminal or mobile user terminal with a telecommunications network and wherein said method comprises:
   intercepting data frames exchanged on the network by said on-board user terminal or mobile user terminal in the context of services being executed;
   storing said intercepted frames;
   analyzing said stored frames so as to deduce parameters characterizing the connection including the identification of various services implemented and an associated instantaneous speed of the services based on the deduced parameters, wherein said analysis of the stored frames comprises distributing the frames according to protocol type of the frames, real-time or non-real-time and counting number of frames relating to real-time services and a number of frames relating to non-real-time services; and
   displaying, in real-time, said parameters characterizing the connection through a graphic user interface.

9. An on-board or mobile user terminal having a connection and transmission/reception system with at least one telecommunications network, an execution system adapted to execute at least one service requested by said on-board or mobile user terminal on said at least one telecommunications network according to at least one communication protocol and a graphic user interface, wherein the on-board or mobile user terminal comprises:
   an intercepting and storing system adapted to intercept and store data frames exchanged on the at least one telecommunications network by said on-board or mobile user terminal in the context of services being executed;
   an analysis program adapted to analyze said data frames stored so as to deduce parameters for characterizing the connection of said on-board or mobile user terminal to the at least one telecommunications network, including means for identifying the various services implemented and the services associated instantaneous speed based on the deduced parameters; and
   a real-time viewing system adapted to allow viewing of said parameters for characterizing the connection through said graphic user interface;
   wherein the analysis program is adapted to distribute the frames according to protocol type of the frames, real-time or non-real-time; and
   wherein the analysis program is adapted to count a number of frames relating to real-time services and a number of frames relating to non-real-time services.

10. An on-board user terminal or mobile user terminal comprising a connection and transmission/reception component with at least one telecommunications network, a component configured to execute at least one service requested by said on-board user terminal or mobile user terminal on said at least one telecommunications network according to at least one communication protocol and a graphic user interface, wherein the on-board user terminal or mobile user terminal terminal comprises:
   a component configured to intercept and store data frames exchanged on the at least one telecommunications network by said on-board user terminal or mobile user terminal in the context of services being executed;
   a component configured to analyze said data frames stored so as to deduce parameters for characterizing the connection of said on-board user terminal or mobile user terminal to the at least one telecommunications network, including a component configured to identify the various services implemented and the services' associated instantaneous speed based on a result of the deduced parameters; and a component configured to facilitate real-time viewing of said parameters for characterizing the connection through said graphic user interface;

wherein the component configured to analyze stored data frames comprises a component configured to distribute the frames according to protocol type of the frames, real-time or non-real-time; and wherein the component configured to analyze stored data frames comprises a component configured to count a number of frames relating to real-time services and a number of frames relating to non-real-time services 11. A method for characterizing a connection of an on-board user terminal or mobile user terminal with a telecommunications network, wherein said on-board user terminal or mobile user terminal comprises a component configured to execute at least one service requested by said on-board user terminal or mobile user terminal on said network according to at least one communication protocol, wherein the method comprises:

intercepting data frames exchanged on the network by said on-board user terminal or mobile user terminal in the context of services being executed;

storing said intercepted frames;

analyzing said stored frames so as to deduce parameters characterizing the connection including the identification of various services implemented and an associated instantaneous speed of the services based on the deduced parameters, wherein the analysis of stored data frames comprises distributing the frames according to protocol type of the frames, real-time or non-real-time and counting a number of frames relating to real-time services and a number of frames relating to non-real-time services; and displaying, in real-time, said parameters characterizing the connection through a graphic user interface.

* * * * *